United States Patent
Taura et al.

(10) Patent No.: US 6,795,559 B1
(45) Date of Patent: Sep. 21, 2004

(54) IMPULSE NOISE REDUCER DETECTING IMPULSE NOISE FROM AN AUDIO SIGNAL

(75) Inventors: Kenichi Taura, Tokyo (JP); Masahiro Tsujishita, Tokyo (JP); Masayuki Tsuji, Tokyo (JP); Masayuki Ishida, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 684 days.

(21) Appl. No.: 09/723,201

(22) Filed: Nov. 28, 2000

(30) Foreign Application Priority Data

Dec. 22, 1999 (JP) .......................................... 11-363646

(51) Int. Cl.⁷ .............................................. H04B 15/00
(52) U.S. Cl. ..................... 381/94.8; 381/94.4; 455/222; 455/223
(58) Field of Search ............................ 381/13, 2, 3, 57, 381/94.1–94.8, 107; 455/219, 222, 223, 224, 225

(56) References Cited

U.S. PATENT DOCUMENTS

| | | | |
|---|---|---|---|
| 4,532,475 A | | 7/1985 | Ishigaki et al. |
| 4,965,854 A | * | 10/1990 | Glazebrook ................. 455/224 |
| 5,212,827 A | * | 5/1993 | Meszko et al. ............. 455/219 |
| 5,268,760 A | | 12/1993 | Suyama |
| 5,907,622 A | * | 5/1999 | Dougherty ................... 381/57 |
| 6,385,261 B1 | * | 5/2002 | Tsuji et al. ................ 375/346 |

FOREIGN PATENT DOCUMENTS

| | | |
|---|---|---|
| EP | 930719 A2 | 7/1997 |
| JP | A5735426 | 2/1986 |

OTHER PUBLICATIONS

Mori et al., SAE Technical Paper Series, #850026, pp. 70–94 (1985).

* cited by examiner

Primary Examiner—Forester W. Isen
Assistant Examiner—Corey Chau
(74) Attorney, Agent, or Firm—Birch, Stewart, Kolasch & Birch, LLP

(57) ABSTRACT

An impulse noise reducer detects impulse noise in an audio signal by detecting and smoothing the high-frequency amplitude of the audio signal, attenuating the non-smoothed amplitude according to the smoothed amplitude, and comparing the attenuated amplitude with a threshold. Impulse noise is discriminated from high-frequency audio components because the latter tend to occur in longer-lasting bursts and are therefore attenuated more strongly. The impulse noise reducer is simplified because it does not have to perform intermediate-frequency signal processing, and its sensitivity is not affected by adjacent-channel signals because these signals are substantially absent from the audio signal. The impulse noise reducer can be implemented by digital signal processing, and is suitable for use in a medium-wave AM audio broadcast receiver.

24 Claims, 11 Drawing Sheets

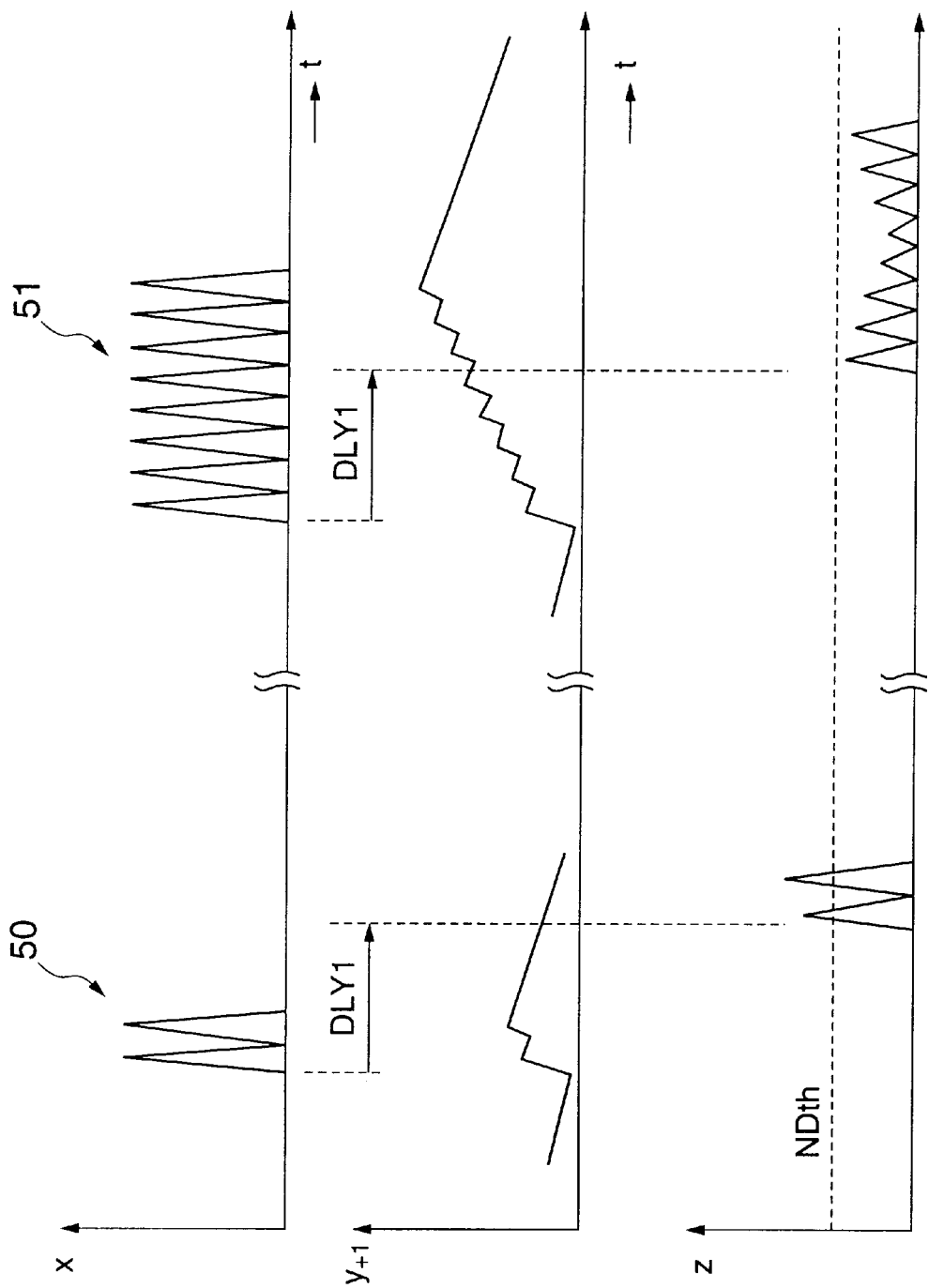

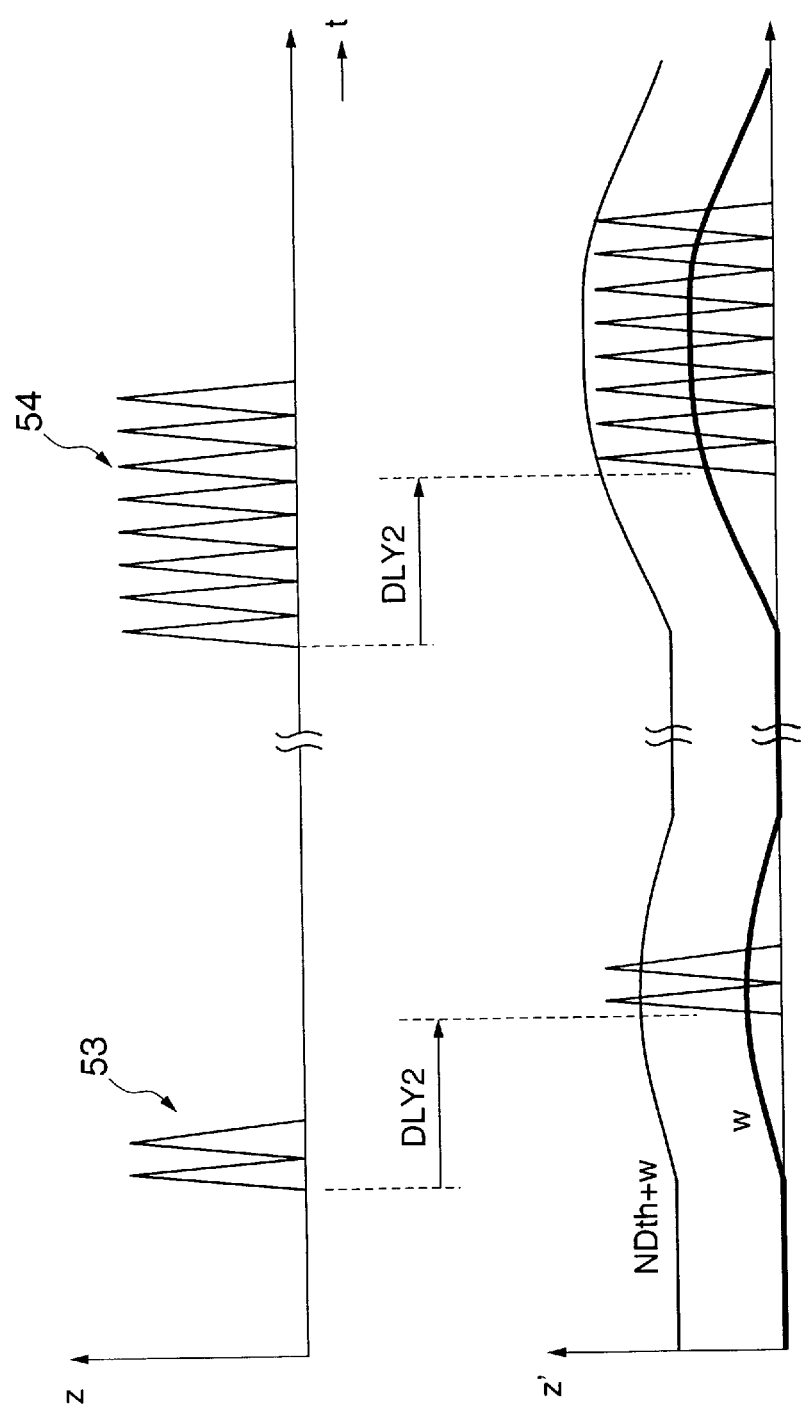

IMPULSE NOISE REDUCER DETECTING IMPULSE NOISE FROM AN AUDIO SIGNAL

BACKGROUND OF THE INVENTION

This invention relates to an impulse noise reducer based on digital signal processing, applicable to a medium-wave amplitude-modulation (AM) audio broadcast receiver.

Impulse noise such as ignition noise is a problem for medium-wave AM audio broadcast receivers in general, and especially for receivers installed in vehicles. Such receivers are therefore often equipped with impulse noise reducers that detect and remove impulse noise. Conventional impulse noise reducers detect impulse noise by processing a comparatively wide-band intermediate-frequency signal, and remove the detected impulse noise from the output audio signal. The reason for this arrangement is that impulse noise can be more easily discriminated from high-frequency audio components in the intermediate-frequency signal than in the audio output signal itself.

A consequent problem is that the impulse noise reducer requires its own intermediate-frequency signal-processing system, including, for example, an intermediate-frequency amplifier, a detector, and automatic gain-control circuitry. The structure of the conventional impulse noise reducer is correspondingly complex, requiring many extra circuit components. This is especially true if the impulse noise reducer has an analog circuit configuration, which has generally been the case in the past.

A further problem is that when a strong adjacent-channel broadcast signal is present, the gain of the intermediate-frequency amplifier in the noise-detection system is automatically reduced, reducing the noise detection sensitivity, so that much impulse noise goes undetected.

Due to the increasing density of digital integrated circuits, digital circuit configurations are becoming advantageous, both because of their smaller size and for compatibility with digital audio broadcast receiving circuits. A digital impulse noise reducer remains complex, however, if it must detect impulse noise from the intermediate-frequency signal, and there also remains the problem of reduced sensitivity when a strong adjacent-channel broadcast signal is present.

SUMMARY OF THE INVENTION

An object of this invention is to reduce the complexity of an impulse noise reducer.

Another object is to improve the performance of an impulse noise reducer.

A further object is to make an impulse noise reducer immune to the effects of adjacent-channel broadcast signals.

The invented method of reducing impulse noise includes the following steps:

(a) detecting the amplitude of a high-frequency component of an audio signal;

(b) smoothing the resulting amplitude signal;

(c) controlling the amplitude of the amplitude signal according to the smoothed amplitude signal, thereby obtaining a gain-controlled amplitude signal;

(d) comparing the gain-controlled amplitude signal with a threshold value, thereby obtaining a noise detection signal;

(e) determining a noise interval from the noise detection signal; and (f) correcting the audio signal during the noise interval.

The complexity of this method is reduced because it detects impulse noise directly from the audio signal, and does not require extra intermediate-frequency signal processing. For the same reason, the invented method is immune to the effects of adjacent-channel broadcast signals, these adjacent-channel signals being substantially absent from the audio signal.

The method may include the further steps of extracting a low-frequency component of the amplitude signal, and adjusting the threshold value according to this low-frequency component, thereby improving the noise reduction performance by detecting impulse noise more accurately.

Step (c) may include the further steps of delaying the amplitude signal by an amount greater than a rising time constant occurring in step (b), and multiplying the delayed amplitude signal by a gain factor that decreases as the smoothed amplitude increases. This also improves the accuracy of impulse noise detection.

The method may include limitation of the amplitude signal before it is smoothed in step (b). Impulse noise detection is thereby improved when a strong noise impulse is followed by a weaker noise impulse.

Step (e) may include extending the interval during which impulse noise is indicated to be present by the noise detection signal. Impulse noise reduction performance is thereby improved when the noise detection signal only intermittently indicates the presence of a substantially continuous interval of impulse noise.

In this case, step (e) may extend the noise interval by a variable amount, depending on the amplitude of the high-frequency component of the audio signal, thereby improving the noise reduction performance for strong noise impulses.

Step (e) may extend the noise interval at both ends, so that initial parts of the noise interval are not missed.

This may be done by, for example, extending the stopping time of the interval by a predetermined amount, then advancing the start of the interval by an amount depending on a total length of the interval, enabling the extension process to be carried out in a simple way.

The invention also provides an impulse noise reducer implementing the invented method, and a medium-wave AM audio broadcast receiver incorporating the invented impulse noise reducer.

BRIEF DESCRIPTION OF THE DRAWINGS

In the attached drawings:

FIG. 4A is a waveform diagram illustrating the signal input to the smoothing module in FIG. 2;

FIG. 4B is a waveform diagram illustrating the signal output from the smoothing module in FIG. 2;

FIG. 4C is a waveform diagram illustrating the inputs to the comparison module in FIG. 2;

FIG. 7A is a waveform diagram illustrating the signal output from the multiplier in FIG. 6;

FIG. 7B is a waveform diagram illustrating the inputs to the comparison module in FIG. 6;

DETAILED DESCRIPTION OF THE INVENTION

Figure 1:
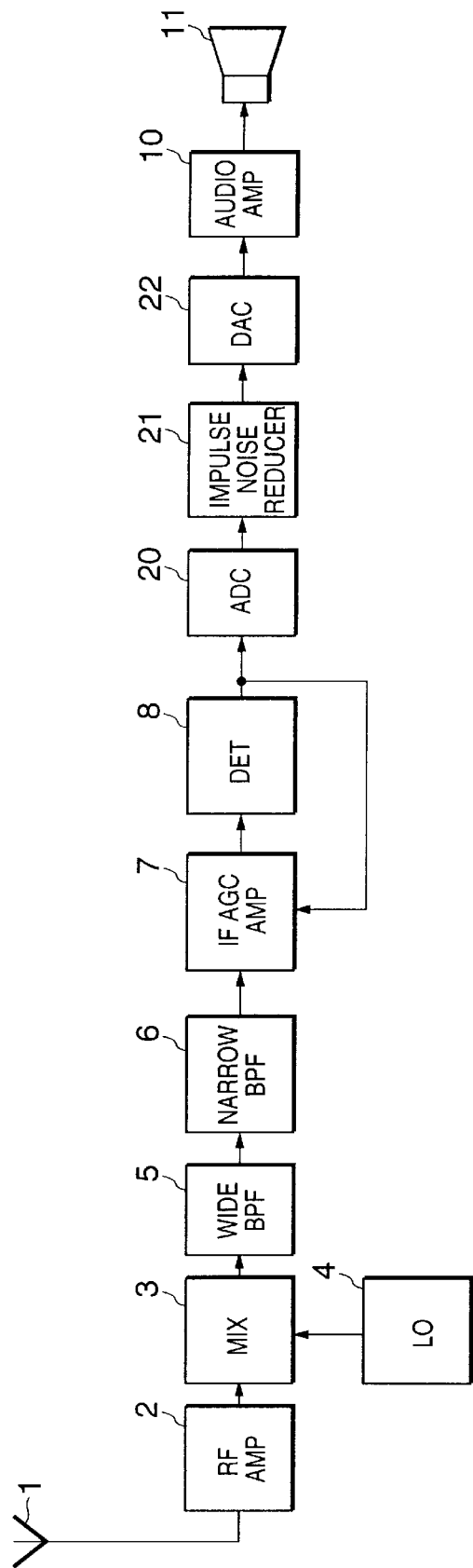
FIG. 1 is a block diagram of a medium-wave AM broadcast receiver embodying the present invention.

Embodiments of the invention will now be described with reference to the attached drawings. A more detailed explanation of relevant aspects of the prior art will also be given. Corresponding elements will be identified by identical reference characters throughout the drawings.

Figure 12:
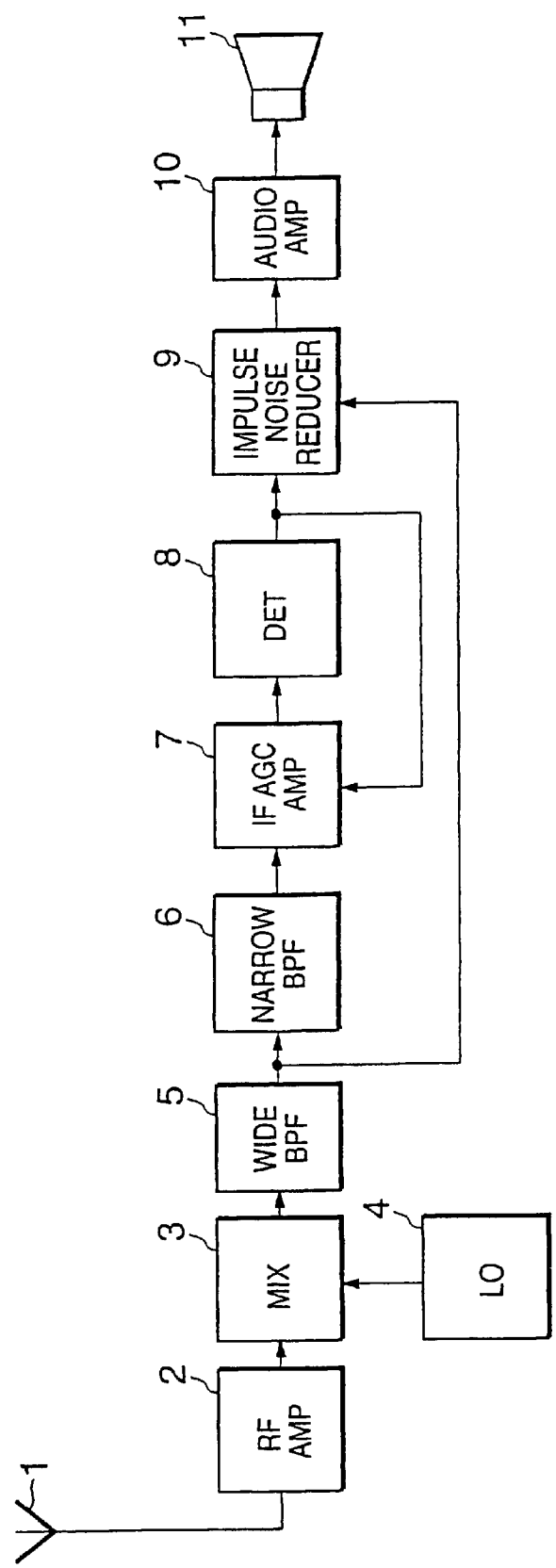
FIG. 12 is a block diagram of a conventional medium-wave AM broadcast receiver.

FIG. 12 shows the structure of a conventional middle-wave AM audio broadcast receiver having an analog impulse noise reducer. The receiver includes an antenna 1, a radio-frequency (RF) amplifier 2, a mixer (MIX) 3, a local oscillator (LO) 4, an intermediate-frequency bandpass filter (BPF) 5 with a comparatively wide passband, an intermediate-frequency bandpass filter 6 with a more narrow passband, an intermediate-frequency automatic-gain-control amplifier (IF AGC AMP) 7, a detector (DET) 8, the impulse noise reducer 9, an audio amplifier (AMP) 10, and a loudspeaker 11.

A broadcast signal received at the antenna 1 is amplified by the radio-frequency amplifier 2 and down-converted by the mixer 3 and local oscillator 4, after which the wide-band intermediate-frequency filter 5 and narrow-band intermediate-frequency filter 6 select the desired intermediate frequency component and reject unwanted components such as adjacent-channel interference. Following automatic gain control, the intermediate-frequency signal is detected by the detector 8 to obtain an audio signal. The audio signal is fed back to the intermediate-frequency automatic gain-control amplifier 7, which holds the audio signal at a constant level. The audio signal is also supplied to the impulse noise reducer 9.

The impulse noise reducer 9 receives the intermediate-frequency signal output by the wide-band intermediate-frequency filter 5, and detects impulse noise from this signal. This comparatively wide-band signal is used for impulse noise detection because once the intermediate frequency band has been narrowed down by the narrow-band intermediate-frequency filter 6, to a bandwidth on the order of 10 kHz, for example, it becomes difficult to discriminate between impulse noise and high-frequency audio components. During intervals in which impulse noise is detected, the impulse noise reducer 9 rejects the impulse noise by continuing to output the last value of the audio signal preceding the noise interval, or by performing linear interpolation between that value and the next value following the noise interval.

The audio signal output from the impulse noise reducer 9 is amplified by the audio amplifier 10 and reproduced through the loudspeaker 11.

FIG. 1 is a block diagram of the invented medium-wave AM broadcast receiver. The antenna 1, RF amplifier 2, mixer 3, local oscillator 4, wide-band intermediate-frequency filter 5, narrow-band intermediate-frequency filter 6, intermediate-frequency automatic-gain-control amplifier 7, detector 8, audio amplifier 10, and loudspeaker 11 are similar to the corresponding elements in the conventional receiver. The analog impulse noise reducer of the conventional receiver is replaced by an analog-to-digital converter (ADC) 20, the invented digital impulse noise reducer 21, and a digital-to-analog converter (DAC) 22.

The analog-to-digital converter 20 converts the analog audio signal obtained from the detector 8 to a digitized audio signal. The impulse noise reducer 21 removes impulse noise from the digitized audio signal. The digital-to-analog converter 22 converts the resulting digital audio signal back to analog form for input to the audio amplifier 10.

Three embodiments of the invented impulse noise reducer 21 will be described next. Further descriptions of the other elements in FIG. 1 will be omitted.

FIRST EMBODIMENT

Figure 2:
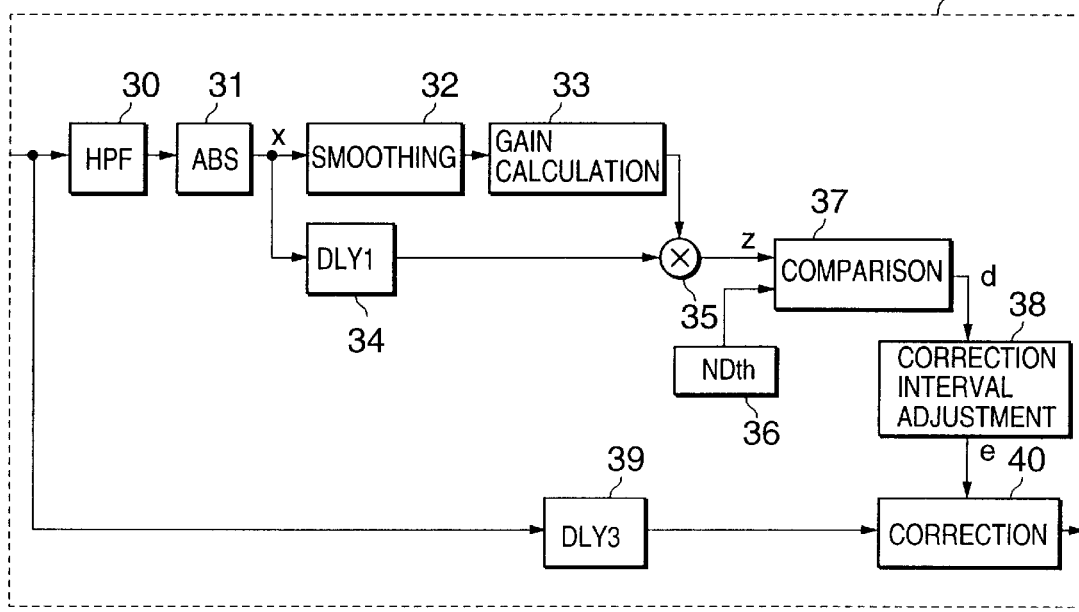
FIG. 2 is a block diagram of a first impulse noise reducer embodying the present invention.

Referring to FIG. 2, a first embodiment of the invented impulse noise reducer 21 comprises a high-pass filter (HPF) 30, an absolute-value (ABS) detector or amplitude detector 31, a smoothing module 32, a gain calculation module 33, a first delay module 34, a multiplier 35, a threshold module 36, a comparison module 37, a correction interval adjustment module 38, an audio delay module 39, and a correction module 40. These elements may be separate hardware modules, as depicted, but the functions of some or all of them may be implemented in software executed by, for example, a digital signal processor (DSP).

The high-pass filter 30 extracts the high-frequency part of the digitized audio signal received from the analog-to-digital converter 20.

The amplitude detection module 31 takes the absolute value of each sample of the high-frequency signal output from the high-pass filter 30, thereby performing a type of amplitude detection and generating an amplitude signal (x) representing the amplitude of the extracted high-frequency part of the audio signal.

The smoothing module 32 smoothes the output of the amplitude detection module 31. The output of the amplitude detection module 31 represents the smoothed amplitude of the high-frequency audio signal.

The gain calculation module 33, first delay module 34, and multiplier 35 together constitute an amplitude control module. The gain calculation module 33 calculates and outputs a gain value that decreases as the smoothed amplitude value output from the smoothing module 32 increases. The gain value is substantially proportional to the reciprocal of the smoothed amplitude. The first delay module 34 delays the amplitude signal (x) output by the amplitude detection module 31 by a predetermined amount DLY1. The multiplier 35 multiplies the delayed signal output from the first delay module 34 by the gain value output from the gain calculation module 33, generating a gain-controlled amplitude signal (z).

The comparison module 37 compares the gain-controlled amplitude signal output from the multiplier 35 with a predetermined noise-detection threshold value NDth received from the threshold module 36, and outputs a noise detection signal (d). The noise detection signal indicates whether the gain-controlled amplitude signal exceeds the noise-detection threshold, implying that impulse noise is present, or does not exceed the noise-detection threshold, implying that impulse noise is not present.

The noise detection signal (d) output from the comparison module 37 is modified in the correction interval adjustment module 38, by extending the lengths of noise detection intervals as described later. The modified noise detection signal (e) is supplied to the correction module 40.

The audio delay module 39 delays the digitized audio signal received from the analog-to-digital converter 20 by a predetermined amount DLY3 that compensates for the delays involved in the noise detection process, and provides the delayed audio signal to the correction module 40.

During intervals indicated by the modified noise detection signal (e) to be free of impulse noise, the correction module 40 simply passes the delayed audio signal to the digital-to-analog converter 22. During a noise interval as indicated by the modified noise detection signal, the correction module 40 continues to output the last value received from the audio delay module 39 before the noise interval began.

Figure 3:
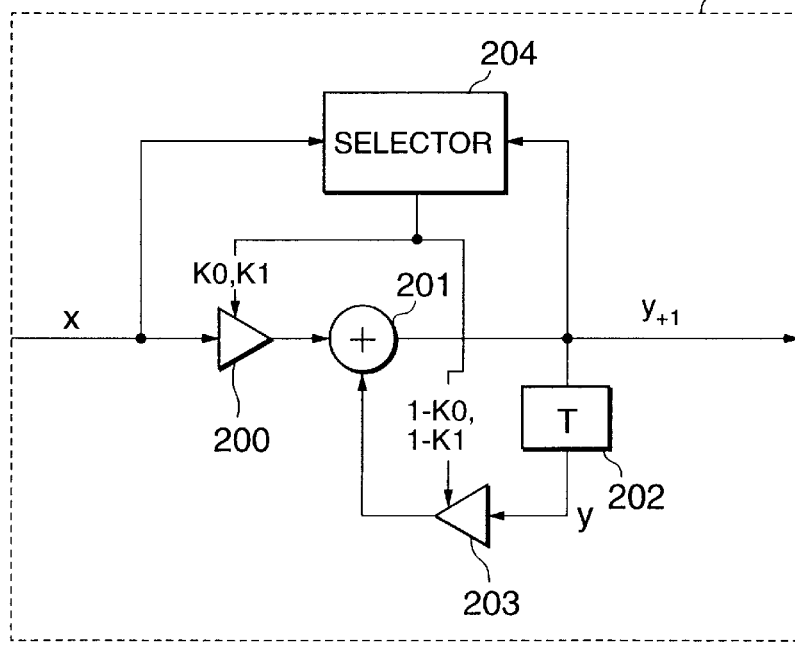
FIG. 3 is a block diagram showing an example of the internal structure of the smoothing module in FIG. 2.

The smoothing module 32 has, for example, the internal structure shown in FIG. 3, comprising a first constant multiplier 200, an adder 201, a one-sample delay module 202, a second constant multiplier 203, and a selector 204.

The first constant multiplier 200 multiplies the amplitude signal (x) by a constant selected by the selector 204, having a value strictly between zero and one. In this example the selection is between two constants K0 and K1, of which K0 is the larger (1>K0>K1 22 0).

The adder 201 adds the product output from the first constant multiplier 200 to another product output from the second constant multiplier 203, thereby generating the smoothed amplitude signal, here denoted $y_{+1}$.

The one-sample delay module 202 delays the smoothed amplitude signal ($y_{+1}$) by one sampling period T to obtain a delayed signal (y).

The second constant multiplier 203 multiplies the delayed signal (y) output from the one-sample delay module 202 by a complementary constant selected by the selector 204 (1−K0 or 1−K1 in this example), and supplies the resulting product to the adder 201.

The selector 204 compares the amplitude signal (x) input to the smoothing module 32 with the smoothed amplitude signal ($Y_{+1}$) output from the smoothing module 32, and selects the constants used by the first constant multiplier 200 and second constant multiplier 203. In this example, the selector 204 selects the larger constant (K0) and its complementary constant (1−K0) when the input value (x) is larger than the output value ($y_{+1}$), and selects the smaller constant (K1) and its complementary constant (1−K1) when the input value (x) is smaller than the output value ($y_{+1}$) By making this selection, the selector 204 controls the time constant of the smoothing module 32.

The operation of the first embodiment will now be described.

A noise impulse appearing in the audio signal tends to exhibit a wide range of frequency components, including frequencies high enough and strong enough to pass through the high-pass filter 30 and appear prominently in the amplitude signal (x) output by the amplitude detection module 31. High-frequency audio components may also be prominent in this signal, but through observation and experiment, the inventor has found that high-frequency audio components of the audio signal itself tend to occur in comparatively long-lasting bursts, while the duration of impulse noise is comparatively short. FIG. 4A schematically illustrates a typical noise impulse 50 followed, somewhat later, by a high-frequency audio burst 51, both as seen in the amplitude signal (x) input to the smoothing module 32, the horizontal axis representing time (t).

If K denotes the constant selected by the selector 204 (either K0 or K1), then the operation of the smoothing module 32 can be described by the following equation, y and $Y_{+1}$ denoting successive outputs of the smoothing module 32 and x denoting the input corresponding to $y_{+1}$.

$$Y_{+1}=Kx+(1-K)y=K(x-y)+y \qquad (1)$$

If the sampling period T is sufficiently small, then $y_{+1}$ can also be approximated as y+Tdy/dt, t being a continuous time variable. Substituting this approximation into the above equation (1) gives a differential equation having a solution of the following form (2).

$$y=B-A\exp(-t \cdot K/T) \qquad (2)$$

If the input signal x changes abruptly at time zero, then A and B are, respectively, the size of the change and the value of x after the change. For example, if x changes abruptly from zero to X at time t=0, then $$y=X(1-\exp(-t \cdot K/T)) \qquad (3)$$

This equation (3) is well known as the equation describing the step response of an analog low-pass filter of the simple type comprising a resistor and a capacitor. T/K is the time constant of the response, equal to the product of the resistance and the capacitance.

From equation (1) above, it can be shown that if the value input to the smoothing module 32 exceeds the value output from the smoothing module 32, then the output value is rising. Since the selector 204 selects the larger constant K0 in this case, the time constant (T/K0) is relatively small and the rise is relatively rapid. Conversely, when the value output from the smoothing module 32 exceeds the value input to the smoothing module 32, then the output value is falling, and since the selector 204 selects the smaller constant K1, the time constant (T/K1) is relatively large and the fall is relatively slow. T/K0 will be referred to as the rising time constant, and T/K1 as the falling time constant.

FIG. 4B illustrates the relatively rapid rise and slower fall of the smoothed amplitude signal ($y_{+1}$) in response to the noise impulse 50 and high-frequency audio burst 51 illustrated in FIG. 4A. FIG. 4C illustrates the gain-controlled amplitude signal (z), that is, the waveform in FIG. 4A delayed by DLY1 in the first delay module 34, then multiplied by a variable gain factor substantially proportional to the reciprocal of the waveform in FIG. 4B. FIG. 4C also illustrates the noise detection threshold NDth.

The delay DLY1 and the constants K0 and K1 are predetermined so that DLY1 exceeds the rising time constant (T/K0), but is less than the sum of the rising and falling time constants (T/K0+T/K1), or at least does not greatly exceed this sum (T/K0+T/K1). The noise detection threshold NDth can be set in relation to these values, on the basis of experimental tests. If K0, K1, DLY1, and NDth are properly chosen, then in the output (z) of the multiplier 35, high-frequency audio bursts will be sufficiently attenuated to remain below the noise detection threshold NDth, while noise impulses will not be attenuated so much and will be detected. The principle behind this operation is as follows.

As illustrated in FIGS. 4A, 4B, and 4C, a noise impulse 50, being brief, does not greatly increase the smoothed amplitude signal ($y_{+1}$), and by the time the delayed noise impulse reaches the multiplier 35, the smoothed amplitude signal has recovered to substantially its normal value. Accordingly, the gain factor output by the gain calculation module 33 has recovered to substantially its normal value, and the noise impulse is only moderately attenuated in the multiplier 35.

A high-frequency audio burst 51, being longer, forces the smoothed amplitude signal ($y_{+1}$) up to a higher level, so that it takes longer to recover to its normal level. The delayed high-frequency audio burst reaches the multiplier 35 at a time when the smoothed amplitude signal is approaching its maximum value, and ends before the smoothed amplitude signal has fallen far below its maximum value. During these times, the gain factor output by the gain calculation module 33 is considerably diminished, producing a large attenuation in the multiplier 35.

The optimum values of the time constants differ, depending on the type of impulse noise to be detected. For the types of impulse noise that a car radio must cope with, the inventor has found time constants between about one and two milliseconds (1 ms to 2 ms) to be suitable, with the optimum delay DLY1 being in the range from one to five milliseconds (1 ms to 5 ms).

The delay DLY1 is an important parameter: if the delay is too short, the leading parts of high-frequency audio bursts will be incorrectly detected as impulse noise; if the delay is too long, the trailing parts of these bursts will be incorrectly detected as impulse noise. In practice, perfect discrimination between impulse noise and high-frequency audio components is difficult, but with appropriate delay and time-constant values, it is generally possible to set the noise detection threshold at a value that provides an adequate noise detection margin without having false detection occur so frequently as to pose a problem.

Figures 5A, 5B:
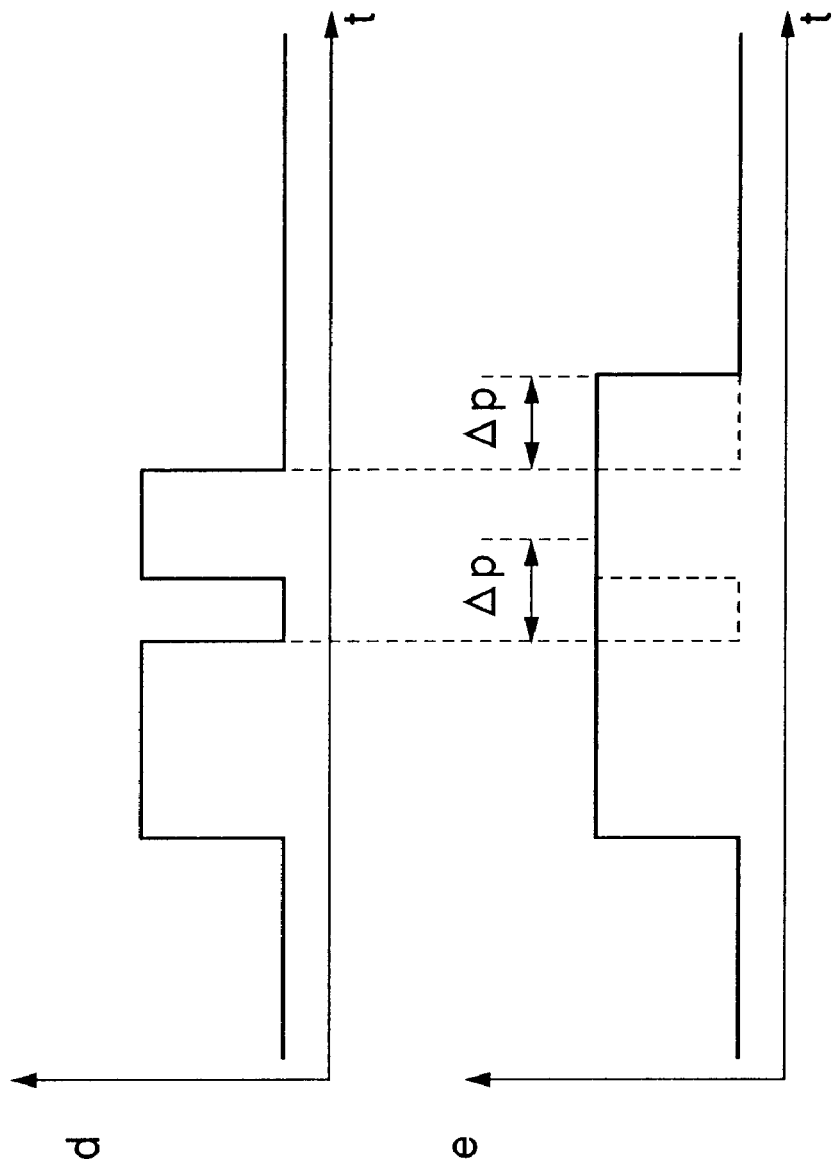
FIG. 5A is a waveform diagram illustrating the signal input to the correction interval adjustment module in FIG. 2.
FIG. 5B is a waveform diagram illustrating the signal output from the correction interval adjustment module in FIG. 2.

The noise detection signal (d) output by the comparison module 37 has, for example, a high logic level when the gain-controlled amplitude signal (z) exceeds the noise detection threshold value (NDth), and a low logic level when z does not exceed NDth. Ideally, the noise detection signal should go high at the onset of a noise impulse and remain high until the noise ends. In practice, however, even an isolated noise impulse may cause the noise detection signal (d) to go high and low intermittently, as illustrated in FIG. 5A. Automobile ignition noise, for example, frequently has this effect.

The correction interval adjustment module 38 accordingly extends each high interval of the noise detection signal (d) by a predetermined amount $\Delta p$, as illustrated in FIG. 5B, to obtain the modified noise detection signal (e). For a medium-wave AM audio broadcast receiver, the optimum value of $\Delta p$ is from twenty to one hundred microseconds (20 $\mu$s to 100 $\mu$s). Each detected noise interval acquires a duration of at least this minimum length, and if the noise detection signal (d) disappears for a time shorter than $\Delta p$ during an episode of impulse noise, the missing part is filled in, so that the modified noise detection signal (e) is continuously high.

An interval over which the modified noise detection signal (e) is continuously high will be referred to as a noise interval. During each noise interval, the correction module 40 holds the audio output signal constant, so that impulse noise is not heard in the audio output.

The first embodiment discriminates accurately between impulse noise and high-frequency audio components on the basis of the audio signal alone, without requiring use of the intermediate-frequency signal. The structure of the first embodiment is correspondingly simple, and even if a strong adjacent-channel broadcast signal is present, it does not significantly affect the operation of the first embodiment, because the adjacent-channel signal is substantially eliminated by the narrow-band intermediate-frequency filter 6. Consequently, the noise-detection sensitivity of the first embodiment is not impaired by adjacent-channel interference. The first embodiment therefore produces an audio output signal with very little residual impulse noise.

In a variation of the first embodiment, the selector 204 in the smoothing module 32 selects from among three or more time constants according to, for example, both the direction and magnitude of changes in the amplitude signal.

SECOND EMBODIMENT

Figure 6:
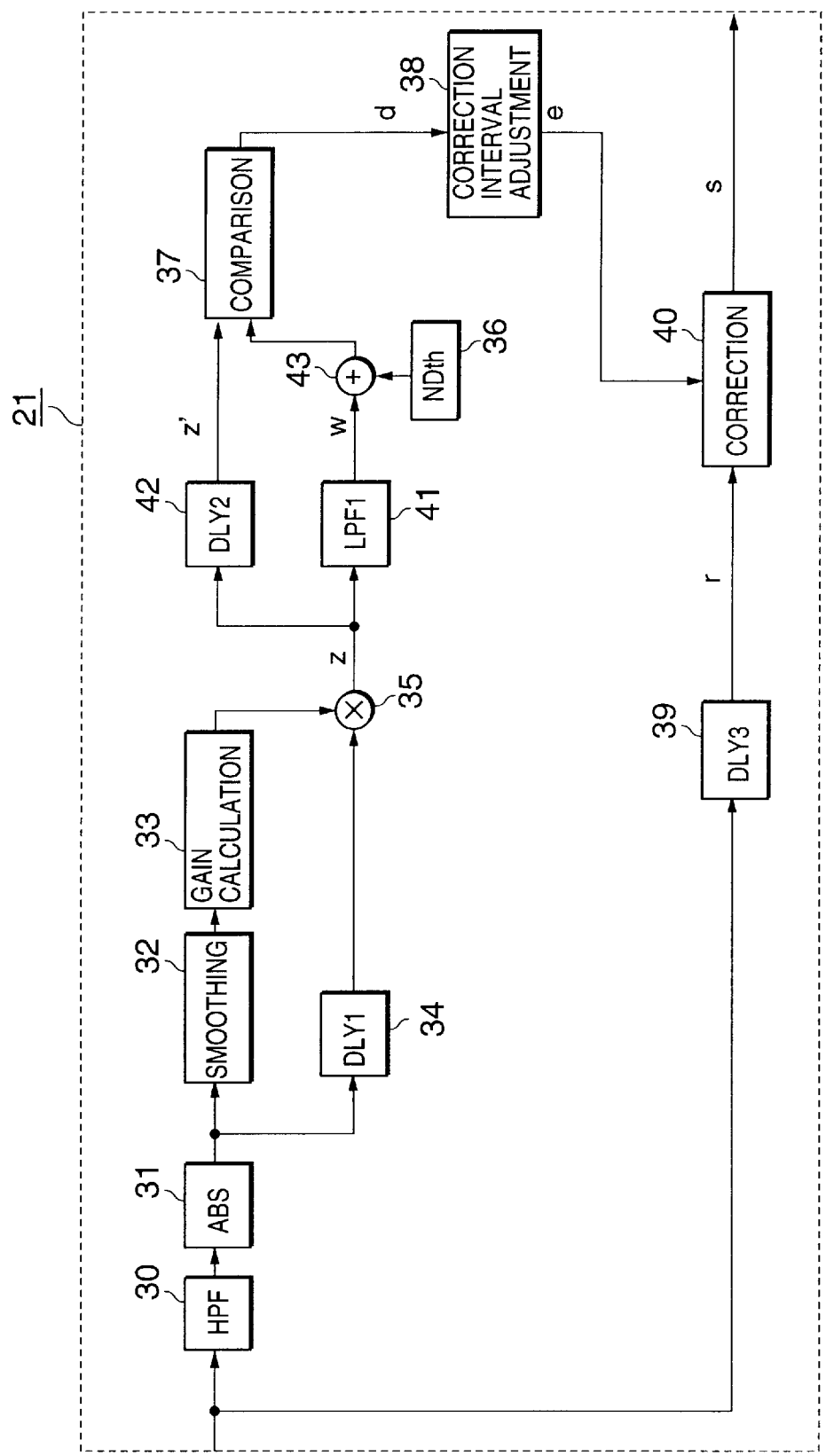
FIG. 6 is a block diagram of a second impulse noise reducer embodying the present invention.

Referring to FIG. 6, a second embodiment of the invented impulse noise reducer 21 comprises the elements 30 to 40 described in the first embodiment, a low-pass filter (LPF) 41, a second delay module 42, and a threshold adjustment module or adder 43. The elements from the high-pass filter 30 to the multiplier 35, the comparison module 37, the audio delay module 39, and the correction module 40 operate as described in the first embodiment; the following description will begin at the point at which the gain-controlled amplitude signal (z) is obtained from the multiplier 35.

The low-pass filter 41 receives the gain-controlled amplitude signal (z) from the multiplier 35, and outputs a low-frequency component (w) thereof.

The second delay module 42 delays the gain-controlled amplitude signal (z) by a predetermined amount DLY2 that compensates for the delay arising in the low-pass filter 41, and supplies the resulting delayed signal (z') to the comparison module 37.

The adder 43 adds the low-frequency component (w) of the gain-controlled amplitude signal, output from the low-pass filter 41, to the noise detection threshold NDth output from the threshold module 36, and supplies the resulting adjusted noise detection threshold value (NDth+w) to the comparison module 37. FIG. 7A schematically shows a noise impulse 53 and a high-frequency audio burst 54 as they might appear in the gain-controlled amplitude signal (z). In this example, the noise impulse 53 and high-frequency audio burst 54 have substantially the same amplitude, despite gain control by the gain calculation module 33.

FIG. 7B shows the corresponding low-frequency component (w) of the gain-controlled amplitude signal, the adjusted noise detection threshold value (NDth+w), and the delayed gain-controlled amplitude signal (z'). The noise impulse 53, being brief, does not greatly increase the low-frequency component signal (w), so the delayed noise impulse still exceeds the adjusted noise detection threshold. The high-frequency audio burst 54, being of longer duration, has a larger effect on the low-frequency component (w) and raises the adjusted noise detection threshold (NDth+w) sufficiently to avoid detection as noise.

In the second embodiment, accordingly, impulse noise can be discriminated from a high-frequency audio burst on the basis of its shorter length, even if gain control fails to produce a significant amplitude difference between the impulse noise and the high-frequency audio burst in the gain-controlled amplitude signal (z).

The second embodiment also differs from the first embodiment in that the correction module 40 performs linear interpolation. The correction module 40 includes an internal audio signal memory (not explicitly indicated in FIG. 6) that stores the most recent samples of the delayed audio signal received from the audio delay module 39, these samples covering an interval of a certain length τ. The audio signal memory may be, for example, a random-access memory operated as a ring buffer, or a device such as a shift register that performs a data shift once every sampling period.

The correction module 40 normally outputs the delayed audio signal as received from the audio delay module 39, with a further delay of length τ. When informed by the correction interval adjustment module 38 of the starting and ending points of a noise interval, the correction module 40 uses the last sample stored preceding the noise interval and the first sample stored following the noise interval to interpolate values into the noise interval, and replaces the stored values in the noise interval with the interpolated values.

Figures 8A, 8B, 8C:
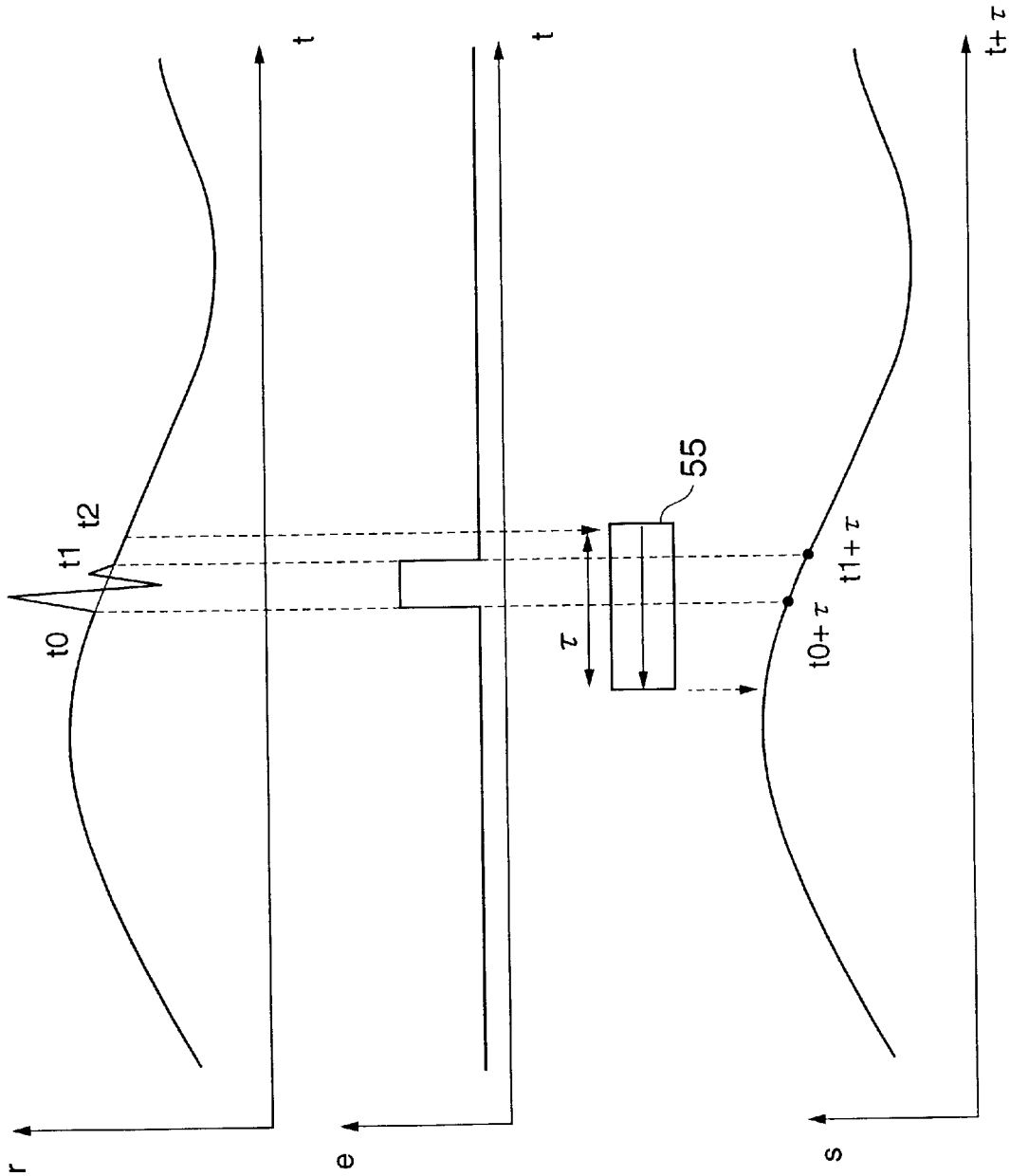
FIG. 8A is a waveform diagram illustrating the audio signal input to the correction module in FIG. 6.
FIG. 8B is a waveform diagram illustrating the noise detection signal input to the correction module in FIG. 6.
FIG. 8C is a waveform diagram illustrating the audio signal output from the correction module in FIG. 6.

FIG. 8A shows a portion of the delayed audio signal (r) output from the audio delay module 39, including a noise interval starting at time t0 and ending at time t1. FIG. 8B shows the corresponding modified noise detection signal (e) output from the correction interval adjustment module 38.

In the second embodiment, incidentally, instead supplying the signal waveform shown in FIG. 8B, the correction interval adjustment module 38 may simply notify the correction module 40 of, for example, the starting time (t0) and duration (t1−t0) of the noise interval, or the ending time (t1) and duration (t1−t0) of the noise interval, the notification being given at the end of the noise interval (at time t1).

At this time (t1), the correction module 40 stores a portion of the audio signal of the above-mentioned length τ in its internal audio signal memory 55. The stored signal extends up to a time t2 which may be later than time t1, depending on the delay DLY3 imparted by the audio delay module 39, and at least does not precede time t1. Upon learning at time t1 of the starting and ending points of the noise interval, the correction module 40 performs linear interpolation over the interval from t0 to t1, replacing the stored data in the noise interval with interpolated data. The audio signal (s) output from correction module 40 then has a continuous waveshape as shown in FIG. 8c, even if the noise interval is comparatively long.

Figure 9:
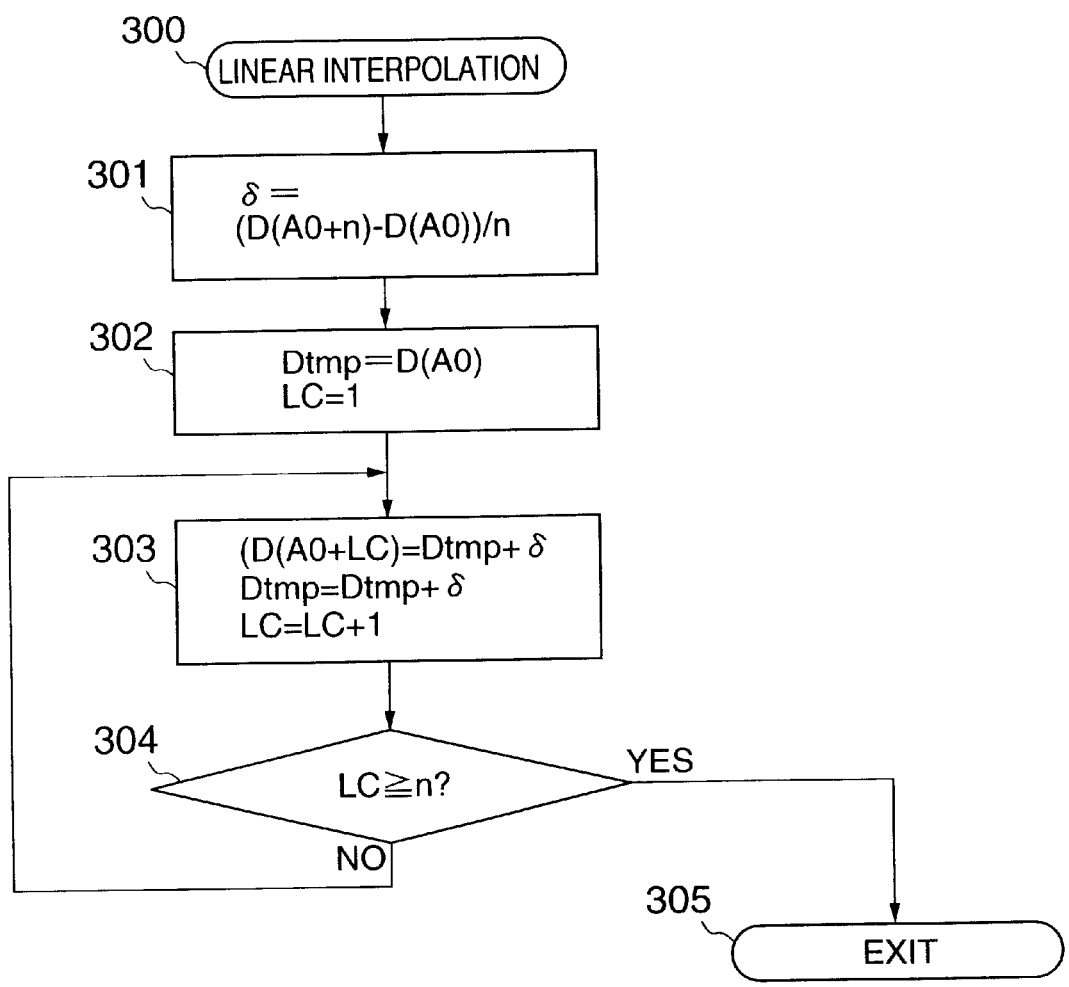
FIG. 9 is a flowchart describing the operation of the correction module in FIG. 6.

Referring to FIG. 9, linear interpolation begins (step 300) when the correction module 40 is informed by the correction interval adjustment module 38 that a noise interval has been detected, and is given the starting and ending times of the noise interval, or one of these times and the duration of the noise interval. The duration will be denoted by a number (n) of stored samples from the beginning to the end of the noise interval. The storage address of the first sample following the noise interval will be denoted A0. The storage address of the last sample preceding the noise interval is then A0+n. The data stored at these addresses will be denoted D(A0) and D(A0+n).

The first step in the linear interpolation process is to calculate an increment δ equal to the difference between D(A0) and D(A0+n), divided by n (step 301).

$$\delta = (D(A0+n) - D(A0))/n$$

Next, an interim interpolated data value Dtmp is initialized to D(A0), and an interpolation counter LC is initialized to 1 (step 302).

Next, the value Dtmp+δ is stored at address A0+LC; then the value of Dtmp is updated to Dtmp+δ, and the interpolation counter LC is incremented by one (step 303).

The interpolation counter LC is now compared with n (step 304). If LC is less than n, the interpolation process returns to step 303 and continues. If LC equals or exceeds n, the interpolation process ends (step 305).

Other aspects of the operation of the second embodiment are similar to the first embodiment, except that the correction interval adjustment module 38 must not report noise intervals of a length exceeding τ. Accordingly, if the length of a noise interval, including the extension added by the correction interval adjustment module 38, reaches the limit (τ), the correction interval adjustment module 38 unconditionally terminates the noise interval and notifies the correction module 40 of the starting time (or ending time) and duration (τ).

Compared with the first embodiment, the second embodiment detects impulse noise more accurately, and removes the noise with less distortion of the audio output signal.

THIRD EMBODIMENT

Figure 10:
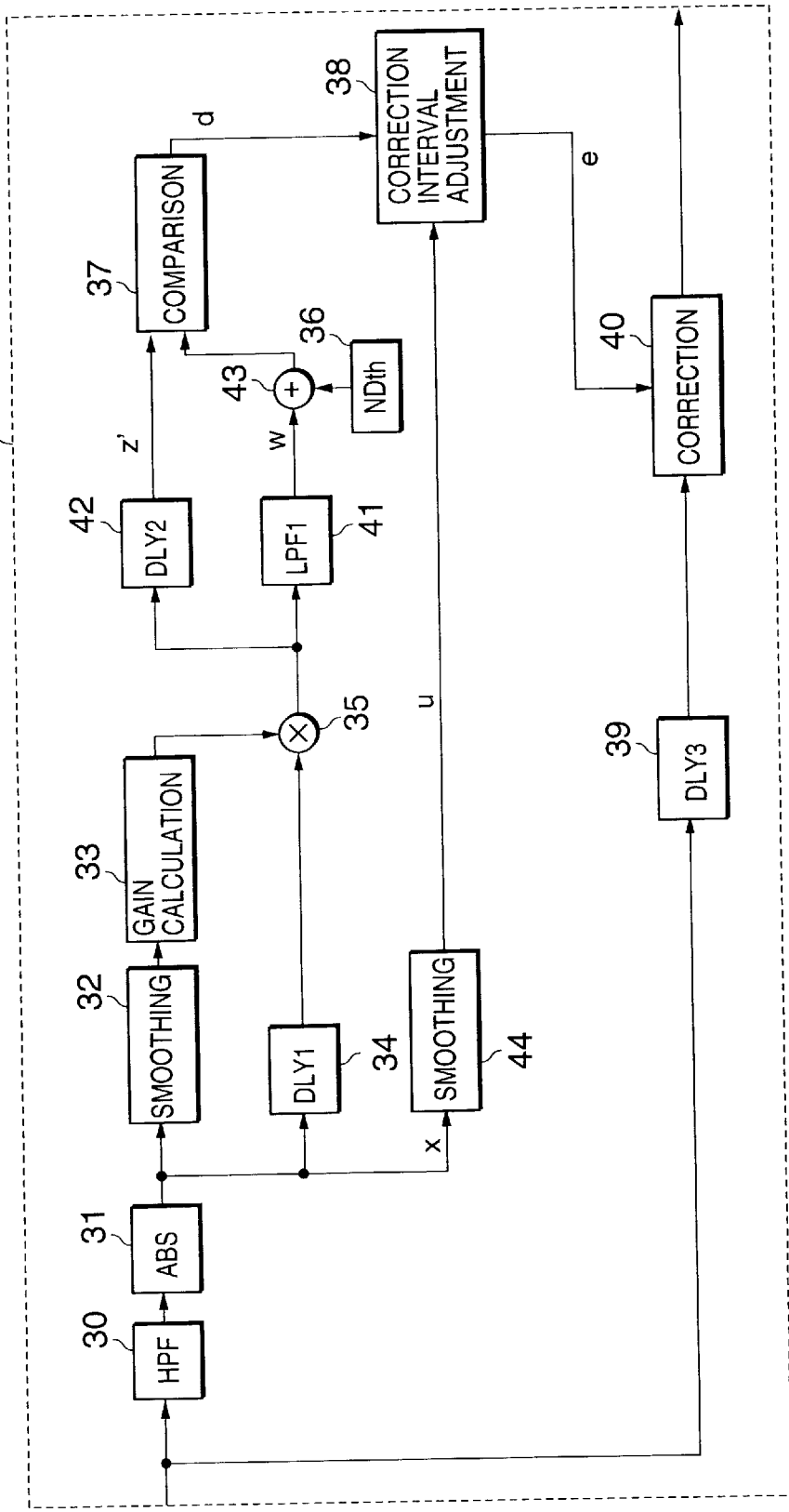
FIG. 10 is a block diagram of a third impulse noise reducer embodying the present invention.

Referring to FIG. 10, the third embodiment includes the elements 30 to 43 described in the preceding embodiments, and an auxiliary smoothing module 44. Aside from the correction interval adjustment module 38 and the auxiliary smoothing module 44, these elements operate as described in the preceding embodiments.

The auxiliary smoothing module 44 smoothes the amplitude signal (x) output from the amplitude detection module 31, operating separately from the smoothing module 32, and supplies the resulting smoothed output (u) to the correction interval adjustment module 38.

The correction interval adjustment module 38 differs from the correction interval adjustment module in the preceding embodiments in that it modifies the noise detection signal (d) by extending each detected noise interval in both directions, by an amount depending on the output (u) of the auxiliary smoothing module 44. That is, instead of adding a fixed amount Δp to the ending time of each noise interval, the correction interval adjustment module 38 adds a variable amount to the ending time, and subtracts another variable amount from the starting time, so that the noise interval is extended at both ends. The size of the extension increases with the value (u) output from the smoothing module 32.

Figure 11:
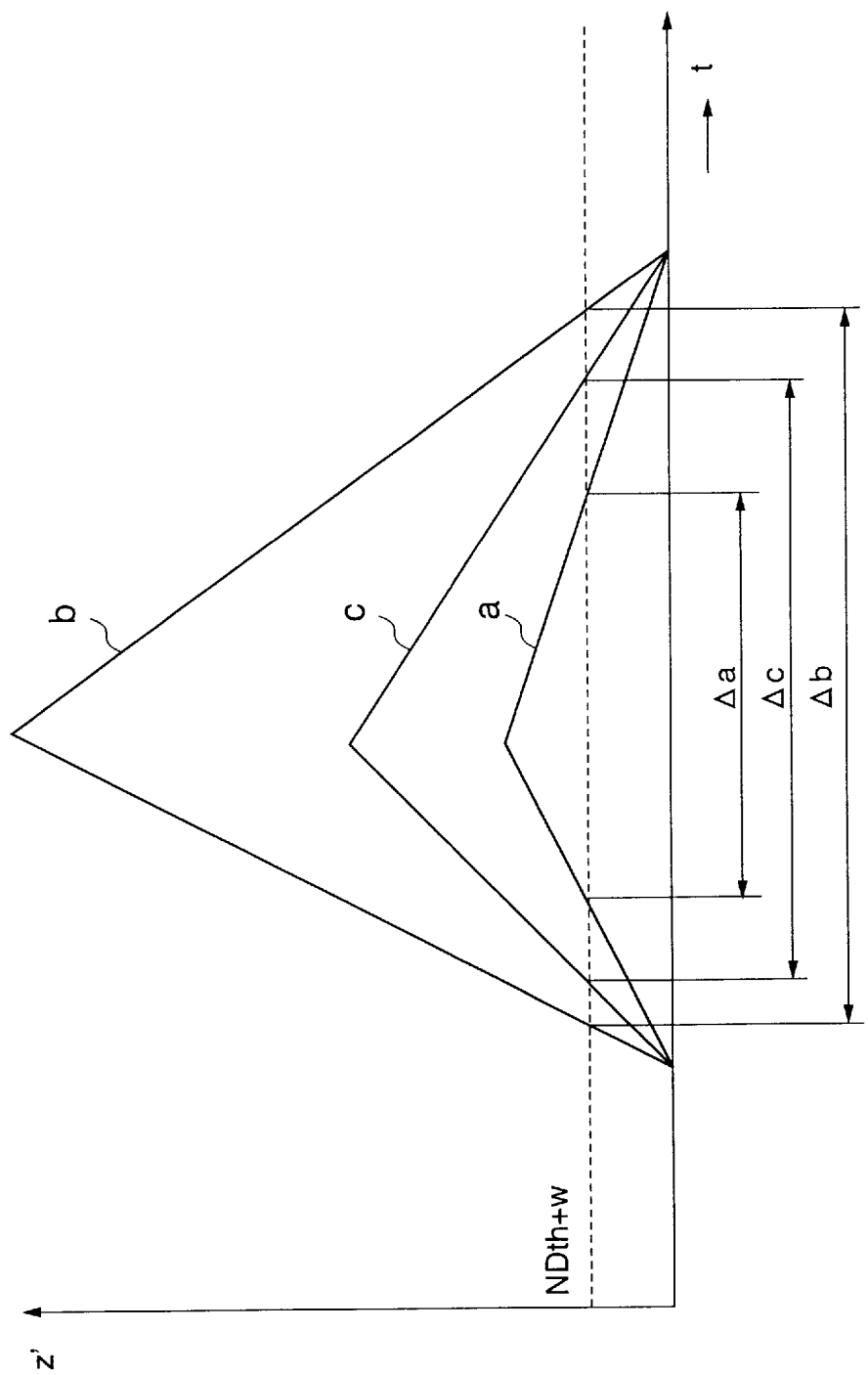
FIG. 11 is a waveform diagram schematically illustrating the inputs to the comparison module in FIG. 10.

FIG. 11 shows three simplified envelope waveforms of the gain-controlled amplitude signal (z′) input from the second delay module 42 to the comparison module 37. For simplicity, the noise detection threshold (NDth+w) is shown as constant. The lowermost waveform (a) is obtained from a comparatively low-level noise impulse. Gain control by the gain calculation module 33 is moderate, and the comparison module 37 detects an adequate noise interval of width Δa.

If a much higher-level noise impulse were to be processed with the same gain conditions, the result would be the uppermost waveform (b), and the comparison module 37 would detect a noise interval of width Δb. This width Δb may be adequate, but the actual gain conditions are not the same, because the gain calculation module 33 reduces the gain, so that the comparison module 37 receives a lower-level waveform (c). Accordingly, the comparison module 37 detects a noise interval with a shorter width Δc, which may not be adequate, especially since it is shortened at both ends.

By extending the noise detection interval at both ends, and by increasing the lengths of the extensions according to the amplitude level (u) detected by the auxiliary smoothing module 44, the correction interval adjustment module 38 in the third embodiment compensates for this shortening effect, enabling even strong noise impulses to be completely removed from the output audio signal.

By employing an auxiliary smoothing module 44 separate from the smoothing module 32, the third embodiment enables the auxiliary smoothing module 44 to operate with, for example, time constants differing from those used in the smoothing module 32, so that the auxiliary smoothing module 44 can be optimized for the purpose of adjusting the detected noise interval.

In a variation of the third embodiment, however, the auxiliary smoothing module 44 is omitted, and the correction interval adjustment module 38 receives the output of the smoothing module 32 instead. The structure of the third embodiment can thereby be simplified.

In another variation of the third embodiment, the correction interval adjustment module 38 is further simplified by making the extensions added to the noise intervals constant instead of variable. Alternatively, a variable extension can be made at only one end of the noise interval.

In yet another variation of the third embodiment, the correction interval adjustment module 38 extends the noise interval by a predetermined amount Δp as described in the first embodiment, then advances the start of the noise interval according to its total length, including the Δp extension. This variation does not require input of any smoothed amplitude signal to the correction interval adjustment module 38.

In still another variation of the third embodiment, the smoothing module 32 performs an amplitude limitation process before the smoothing operation. That is, when the amplitude signal (x) is input to the smoothing module 32, values exceeding a predetermined limit are reduced to that limit. Amplitude limitation prevents the smoothed amplitude signal from reaching too high a value, so that even after the occurrence of a very strong noise impulse, the smoothed amplitude signal can recover to its normal level within a reasonable time. Accordingly, if the strong noise impulse is followed by a weaker noise impulse, the gain value output by the gain calculation module 33 will be able to recover to its normal value in time for the weaker noise impulse to be detected. This variation is also applicable to the preceding embodiments.

Those skilled in the art will recognize that further variations are possible within the scope claimed below.

What is claimed is:

1. A method of reducing impulse noise in an audio signal, comprising:
   detecting an amplitude of a high-frequency component of the audio signal, thereby obtaining an amplitude signal;
   smoothing the amplitude signal, thereby obtaining a smoothed amplitude signal;
   controlling the amplitude of the amplitude signal according to the smoothed amplitude signal, thereby obtaining a gain-controlled amplitude signal;
   comparing the gain-controlled amplitude signal with a threshold value, thereby obtaining a noise detection signal indicating presence and absence of said impulse noise;
   determining a noise interval from the noise detection signal; and
   correcting the audio signal during the noise interval.

2. The method of claim 1, further comprising the steps of:
   extracting a low-frequency component of the amplitude signal; and
   adjusting the threshold value according to said low-frequency component.

3. The method of claim 1, wherein the smoothing step operates with a certain rising time constant, and the said controlling step further comprises the steps of:
   delaying the amplitude signal by an amount greater than said rising time constant, thereby obtaining a delayed amplitude signal;
   determining a gain based on the smoothed amplitude signal, the gain decreasing as the smoothed amplitude signal increases; and
   multiplying the delayed amplitude signal by said gain.

4. The method of claim 1, wherein the smoothing step includes limiting the amplitude signal before the amplitude signal is smoothed.

5. The method of claim 1, wherein the noise interval determining step includes extending an interval during which impulse noise is indicated by the noise detection signal.

6. The method of claim 5, wherein the noise interval determining step extends said interval by a variable amount depending on the amplitude of the high-frequency component of the audio signal.

7. The method of claim 5, wherein the noise interval determining step extends said interval at both ends.

8. The method of claim 7, wherein the noise interval determining step extends a stopping time of said interval by a predetermined amount, and extends a starting time of said interval by an amount depending on a total length of said interval.

9. The method of claim 1, wherein the smoothing step has a step response approximating the step response of a simple resistor-capacitor low-pass filter.

10. The method of claim 9, wherein:
    the smoothing step is preformed with a first time constant when the amplitude signal is rising and a second time constant when the amplitude signal is falling; and
    the first time constant if smaller than the second time constant, thereby causing a rising time of the smoothed amplitude signal to be faster than a falling time of the smoothed amplitude signal.

11. The method of claim 10, wherein the controlling step further comprises:
    delaying the amplitude control signal by delay time DEL, wherein DEL is greater than the first time constant; and
    controlling a gain of the delayed amplitude signal based on the smoothed amplitude signal, wherein the gain is controlled to decrease as the smoothed amplitude signal increases, and the gain is controlled to increase as the smoothed amplitude signal decreases.

12. The method of claim 1 wherein the smoothing step obtains a value $y_n$ of the smoothed amplitude signal at sampling time n according to the following equations:

$$y_n = K_o \cdot x + (1-K_o) \cdot y_{(n-1)}, \text{ if } x > y_{(n-1)},$$

and $$y_n = K_1 \cdot x + (1-K_1) \cdot y_{(n-1)}, \text{ if } x \leq y_{(n-1)};$$

wherein
   x = a value of the amplitude signal sampled at time n;
   $y_{(n-1)}$ = the value of the smoothed amplitude signal obtained at time (n−1); and
   $K_o$ and $K_1$ = constant values, such that $K_o > K_1$.

13. The method of claim 12, wherein the controlling step further comprises:
   delaying the amplitude signal by delay time DLY, wherein $DLY > (T/K_o)$, T being a sampling period of the amplitude signal; and controlling a gain of the delayed amplitude signal based on the smoothed amplitude signal, wherein the gain is controlled to decrease as the smoothed amplitude signal increases, and the gain is controlled to increase as the smoothed amplitude signal decreases.

14. The method of claim 1, wherein the correcting step corrects the audio signal by holding the audio signal at a constant level during the noise interval.

15. The method of claim 1, wherein the correcting step corrects the audio signal by interpolating values using values of a last sample of the audio signal preceding the noise interval and a first sample of the audio signal following the noise interval, and replacing values of the audio signal during the noise interval with the interpolated values.

16. An impulse noise reducer for reducing impulse noise in an audio signal, comprising:

an amplitude detection module operable to detect an amplitude of a high-frequency-component of the audio signal, thereby obtaining an amplitude signal;

a smoothing module coupled to the amplitude detection module, operable to smooth the amplitude signal, thereby obtaining a smoothed amplitude signal;

an amplitude control module coupled to the amplitude detection module, operable to control the amplitude of the amplitude signal according to the smoothed amplitude signal, thereby obtaining a gain-controlled amplitude signal;

a comparison module coupled to the amplitude control module, operable to compare the gain-controlled amplitude signal with a threshold value, thereby obtaining a noise detection signal indicating presence and absence of said impulse noise;

a correction interval adjustment module coupled to the comparison module, operable to determine a noise interval from the noise detection signal; and a correction module coupled to the correction interval adjustment module, operable to correct the audio signal during the noise interval.

17. The impulse noise reducer of claim 16, further comprising a low-pass filter operable to extract a low-frequency component of the amplitude signal; and a threshold adjustment module operable to adjust the threshold value according to said low-frequency component.

18. The impulse noise reducer of claim 16, wherein the smoothing module operates with a certain rising time constant, and the amplitude control means includes:

a first delay module operable to delay the amplitude signal by an amount greater than said rising time constant, thereby obtaining a delayed amplitude signal;

a gain calculation module operable to determine a gain from the smoothed amplitude signal, the gain decreasing as the smoothed amplitude signal increases; and a multiplier operable to multiply the delayed amplitude signal by said gain.

19. The impulse noise reducer of claim 16, wherein the smoothing module is operable to limit the amplitude signal before smoothing the amplitude signal.

20. The impulse noise reducer of claim 16, wherein the correction interval adjustment module is operable to determine said noise interval by extending an interval during which impulse noise is indicated by the noise detection signal.

21. The impulse noise reducer of claim 20, wherein the correction interval adjustment module is operable to extend said interval by a variable amount depending on the amplitude of the high-frequency component of the audio signal.

22. The impulse noise reducer of claim 20, wherein the correction interval adjustment module is operable to extend said interval at both ends, thereby adjusting a timing at which the correction module begins correcting the audio signal.

23. The impulse noise reducer of claim 22, wherein the correction interval adjustment module is operable to extend a stopping time of said interval by a predetermined amount, and extend a starting time of said interval by an amount depending on a total length of said interval.

24. A medium-wave AM audio broadcast receiver including the impulse noise reducer of claim 16.

* * * * *